United States Patent
Koike et al.

[11] Patent Number: 5,254,157
[45] Date of Patent: Oct. 19, 1993

[54] RECORDING SOLUTION CONTAINING A COMPOUND OBTAINED BY ALKYLATION OR ACETYLATION OF A TRIOL

[75] Inventors: Shoji Koike; Kyoko Fukushima, both of Yokohama; Koromo Shirota, Inagi, all of Japan

[73] Assignee: Canon Kabushiki Kaisha, Tokyo, Japan

[21] Appl. No.: 748,812

[22] Filed: Aug. 22, 1991

[30] Foreign Application Priority Data

Aug. 24, 1990 [JP] Japan .................... 2-221178

[51] Int. Cl.$^5$ .............................................. C09D 11/02
[52] U.S. Cl. ................................. 106/20 D; 106/20 R
[58] Field of Search ...................... 106/20, 20 D, 20 R

[56] References Cited

U.S. PATENT DOCUMENTS

| | | | |
|---|---|---|---|
| 4,578,117 | 3/1986 | Nakanishi | 106/20 |
| 4,632,703 | 12/1986 | Koike et al. | 106/22 |
| 4,689,078 | 8/1987 | Koike et al. | 106/22 |
| 4,725,849 | 2/1988 | Koike et al. | 346/1.1 |
| 4,864,324 | 9/1989 | Shirota et al. | 346/1.1 |
| 4,923,515 | 5/1990 | Koike et al. | 106/22 |
| 4,957,553 | 9/1990 | Koike et al. | 106/20 |
| 4,969,951 | 11/1990 | Koike et al. | 106/22 |
| 4,986,850 | 1/1991 | Iwata et al. | 106/25 |

FOREIGN PATENT DOCUMENTS

| | | |
|---|---|---|
| 0027709 | 4/1981 | European Pat. Off. . |
| 0376284 | 7/1990 | European Pat. Off. . |
| 54-59936 | 5/1979 | Japan . |
| 55-29546 | 3/1980 | Japan . |
| 56-57862 | 5/1981 | Japan . |
| 57-57763 | 4/1982 | Japan . |

*Primary Examiner*—Mark L. Bell
*Assistant Examiner*—Margaret Einsman
*Attorney, Agent, or Firm*—Fitzpatrick, Cella, Harper & Scinto

[57] ABSTRACT

A recording solution including a coloring matter and a liquid medium, wherein said recording solution contains a compound obtained by alkylation or acetylation of one or two hydroxyl group(s) of a triol having 4 or more carbon atoms.

14 Claims, 3 Drawing Sheets

RECORDING SOLUTION CONTAINING A COMPOUND OBTAINED BY ALKYLATION OR ACETYLATION OF A TRIOL

BACKGROUND OF THE INVENTION

1. Field of the Invention

The present invention mainly relates to a recording solution, in particular, a recording solution useful for an ink-jet recording process, and an ink-jet recording process making use of the recording solution. More particularly, it relates to a recording solution and an ink-jet recording process making use of the recording solution that are capable of achieving highly detailed and high-image quality recording not only on coated paper specially prepared for ink-jet recording but also on non-coated paper such as paper for copying, paper for reporting, notepaper, letter paper, bond paper or continuous business form paper, i.e., what is called plain paper, commonly used in offices and homes. The present invention also relates to an ink cartridge and an ink-jet device that contain such a recording solution, and an ink-jet recording apparatus equipped with such an ink-jet device.

2. Related Background Art

Inks with greatly various manners of composition have been hitherto reported in respect of inks for ink-jet recording. In particular, in recent years, detailed researches and development have been made from various approaches such as composition and physical properties of inks so that a good record can be made even on plain paper such as paper for copying, paper for reporting, notepaper, letter paper, bond paper or continuous business form paper, commonly used in offices.

For example, inks usually contain high-boiling organic solvents such as glycols for the purposes of anti-drying, anti-clogging and so forth. When recording is carried out using such inks on a plain paper having a high degree of sizing, ink does not readily penetrate into paper and the part on which a record has been made does not well dry, so that when recorded characters or the like are touched the hand may be stained with ink or the characters are rubbed to become smeared. Thus, there has been a problem on fixing performance.

Under such circumstances, in order to increase the penetrability of ink into paper, Japanese Patent Application Laid-open No. 55-29546 proposes a method in which a surface active agent is added in ink in a large quantity. In such an instance, however, the following troubles have been caused: Feathering occurs very frequently on some kind of paper; when filled in an ink-jet recording head, the ink recedes from the orifice surface depending on the structural conditions of the head, resulting in no ejection of ink, or on the other hand the whole of the orifice surface becomes wet, also resulting in no ejection of ink.

Japanese Patent Application Laid-open No. 56-57862 also proposes a method in which the pH of ink is set to the alkaline side. In this instance, however, there are the disadvantages such that the ink is harmful when touched with hands or that no good results can be obtained in view of both feathering and drying performance when the ink is used on paper containing a certain kind of sizing agent, e.g., neutralized paper.

Japanese Patent Application Laid-open No. 57-57763 proposes an ink containing a compound obtained by acetylation of glycerol. Incorporation of this compound in an ink brings about the problem that print quality level may be lowered when characters or the like are printed on a certain kind of paper.

Besides the foregoing, various improvements have been attempted. Up to the present, however, no ink is known which can well settle all the above problems on feathering, drying performance and safety of ink, and also the problem of clogging.

SUMMARY OF THE INVENTION

Accordingly, an object of the present invention is to provide an ink for ink-jet recording, that has markedly settled the problems of the feathering of ink and the drying retardation of recorded characters or the like, occurring when recording is carried out on non-coated paper such as paper for copying, paper for reporting, notepaper, letter paper, bond paper or continuous business form paper, i.e., what is called plain paper, commonly used in offices and so forth.

Another object of the present invention is to provide an ink for ink-jet recording, having a high safety even when used in offices and homes.

Still another object of the present invention is to provide an ink that is not liable to cause clogging at the nozzles of a head for ink-jet recording, and also has a good reliability.

A further object of the present invention is to provide an ink-jet recording process that enables high-detail and high image quality recording on plain paper by the use of the above ink.

A still further object of the present invention is to provide an ink cartridge, an ink-jet device and an ink-jet recording apparatus, that can promise superior storage stability and ejection performance of the recording solution and also achieve a good frequency response.

The above objects of the present invention can be achieved by the present invention described below. The present invention provides a recording solution comprising a coloring matter and a liquid medium, wherein said recording solution contains a compound obtained by alkylation of one or two hydroxyl group(s) of a triol (trihydric alcohol) having 4 or more carbon atoms.

As another embodiment of the recording solution, the present invention provides a recording solution comprising a coloring matter and a liquid medium, wherein said recording solution contains a compound obtained by acetylation of one or two hydroxyl group(s) of a triol having 4 or more carbon atoms.

The present invention also provides an ink-jet recording process comprising the step of imparting droplets of a recording solution to a recording medium to make a record on said recording medium, wherein either of the recording solutions as described above is used.

The present invention still also provides an ink-jet device comprising;
  an ink holding member impregnated with either of the recording solutions as described above; and
  a head having an orifice from which said recording solution is ejected in the form of ink droplets.

The present invention still further provides an ink-jet recording apparatus comprising an ink-jet device comprising;
  an ink holding member impregnated with either of the recording solutions as described above; and
  a head having an orifice from which said recording solution is ejected in the form of ink droplets.

The present invention still further provides an ink cartridge comprising an ink bag impregnated with either of the recording solutions as described above.

DESCRIPTION OF THE PREFERRED EMBODIMENTS

Figure 1A:
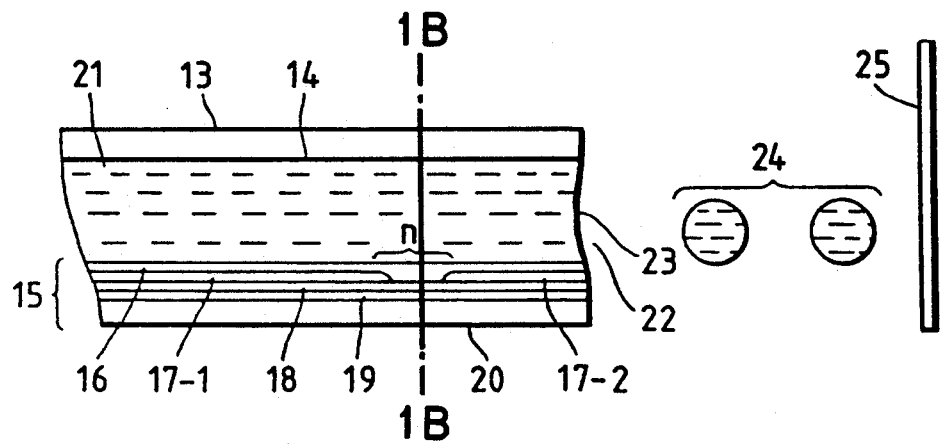
FIGS. 1A and 1B illustrate a longitudinal cross section and a transverse cross section, respectively, of a head of an ink-jet recording apparatus.

The present inventors have made intensive studies on various manners of ink composition in order to improve anti-feathering and fixing performance of ink on plain paper. As a result, they have discovered that an ink containing a compound obtained by alkylation or acetylation of one or two hydroxyl group(s) of a triol having 4 or more carbon atoms can be well balanced in anti-feathering and fixing performance and also can be an ink highly reliable in anti-clogging. They have thus accomplished the present invention.

More specifically, according to what is found by the present inventors, triols including glycerol are preferable solvents among solvents conventionally used in ink because they have a high effect of anti-clogging and also are not liable to cause feathering of ink on paper surface. According to what is also found by the present inventors, triols with more carbon atoms have a better fixing performance on plain paper in relation to their wettability to a sizing agent present in paper.

In the above instance, however, the viscosity of ink increases as the carbon atom number becomes more than that of glycerol, and hence the viscosity of ink more increases as water content evaporates from nozzle tips. This adversely affects the ejection of ink to tend to cause undesirable phenomena such as twists and satellite dots.

On the other hand, such problems of twists and satellite dots do not occur when the compound used in the present invention obtained by alkylation or acetylation of one or two hydroxyl group(s) of a triol having 4 or more carbon atoms is used in ink, because the viscosity of ink more remarkably decreases than that of an ink comprising a triol having not been alkylated or acetylated.

It has been also confirmed that the wettability to sizing agents is more improved and hence the fixing performance to plain paper is greatly improved.

Meanwhile, use of a compound obtained by alkylation or acetylation of glycerol was found to bring about a similar improvement in the fixing performance but result in a deterioration of print quality level on a certain kind of plain paper. Use of a compound obtained by alkylation or acetylation of all the hydroxyl groups of a triol was also found to result in a loss of the anti-clogging effect of ink.

On the other hand, although reasons are unclear, the ink making use of the compound obtained by alkylation or acetylation of one or two hydroxyl group(s) of a triol having 4 or more carbon atoms causes, as previously stated, no deterioration of print quality level and also has a superior anti-clogging effect.

The present invention will be described below in greater detail by giving preferred embodiments.

The compound that is used in the present invention and mainly characterizes the present invention is a compound obtained by alkylation or acetylation of one or two hydroxyl group(s) of a triol having 4 or more carbon atoms. Any of the compound can be obtained by conventionally known methods. Preferred examples of the above compound are shown below. The present invention is by no means limited to these examples.

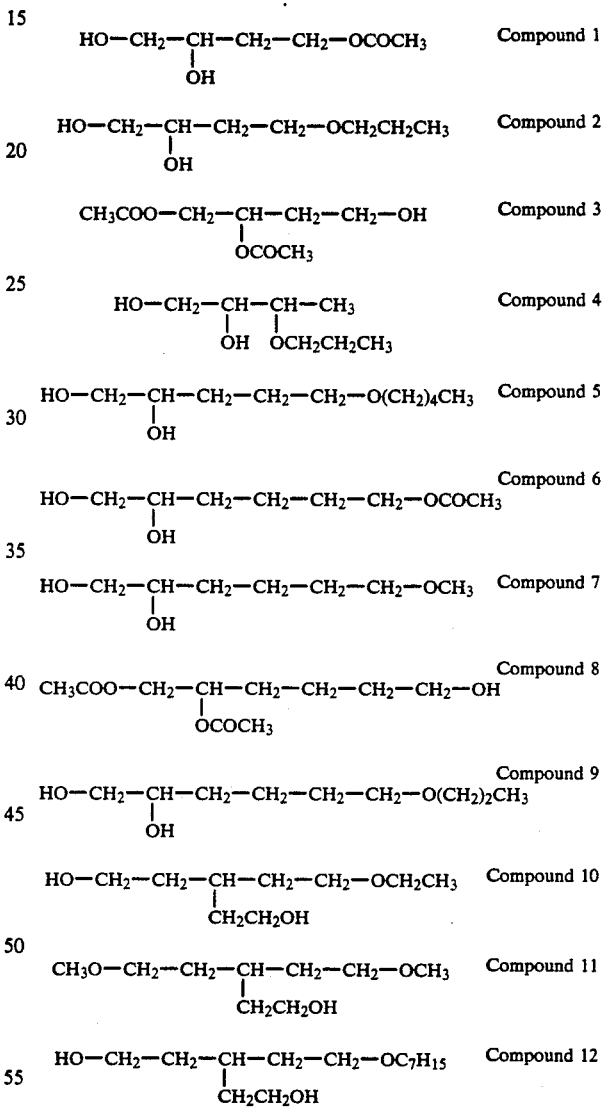

The above examples have been selected by the present inventors as particularly preferred ones as a result of their intensive studies. Among these, the compounds wherein one of the hydroxyl groups has been alkylated or acetylated with an alkyl group having 1 to 4 carbon atoms can bring about particularly good results on the print quality level and fixing performance on plain paper and also on the anti-clogging. The triols to be alkylated or acetylated may most preferably include those having 4 to 10 carbon atoms, and particularly 4 to 7 carbon atoms.

The compounds as described above may be used alone or in the form of a mixture. The amount of any of these compounds to be added in the ink may vary depending on coloring matters used and other liquid medium component such as water used in combination. It may be in the range of approximately from 0.01% by weight to 80% by weight, preferably from 0.1% by weight to 50% by weight, and more preferably from 1% by weight to 30% by weight, based on the ink.

The coloring matter that constitutes the ink of the present invention may include direct dyes, acid dyes, food dyes, basic dyes, reactive dyes, disperse dyes, vat dyes, soluble vat dyes, reactive disperse dyes, oil dyes, and all sorts of pigments. Among these, water-soluble dyes are particularly preferred in view of the performances of ink.

The amount of any of these coloring matters contained depends on the kind of the liquid medium component, the properties required in inks, etc. In general, the coloring matter may be contained in an amount of approximately 0.2% by weight to 20% by weight, preferably 0.5% by weight to 10% by weight, and more preferably 1% by weight to 5% by weight.

The essential components of the ink for ink-jet recording of the present invention are as described above. Other commonly available water-soluble organic solvents used in conventionally known inks can also be used in combination. Such organic solvents may include alkyl alcohols having 1 to 5 carbon atoms, such as methyl alcohol, ethyl alcohol, n-propyl alcohol, iso-propyl alcohol, n-butyl alcohol, sec-butyl alcohol, tert-butyl alcohol, iso-butyl alcohol and n-pentanol; amides such as dimethylformamide and dimethylacetamide; ketones or ketoalcohols such as acetone and deacetone alcohol; ethers such as tetrahydrofuran and dioxane; oxyethylene or oxypropylene addition polymers such as diethylene glycol, triethylene glycol, tetraethylene glycol, dipropylene glycol, tripropylene glycol, polyethylene glycol and polypropylene glycol; alkylene glycols whose alkylene group has 2 to 6 carbon atoms, such as ethylene glycol, propylene glycol, trimethylene glycol, butylene glycol, 1,2,6-hexanetriol and hexylene glycol; thiodiglycol; glycerol; lower alkyl ethers of polyhydric alcohols, such as ethylene glycol monomethyl or -ethyl ether, diethylene glycol monomethyl or -ethyl ether and triethylene glycol monomethyl or -ethyl ether; lower dialkyl ethers of polyhydric alcohols, such as triethylene glycol dimethyl or -ethyl ether and tetraethylene glycol dimethyl or -ethyl ether; sulfolane, N-methyl-2-pyrrolidone, and 1,3-dimethyl-2-imidazolidinone.

The above water-soluble organic solvent may be contained in an amount ranging from 1% by weight to 50% by weight, and preferably from 2% by weight to 30% by weight, based on the total weight of the ink.

When the organic solvents as described above are used in combination, they can be used either alone or in the form of a mixture. A most preferred liquid medium is so composed as to contain at least one water-soluble high-boiling organic solvent as exemplified by polyhydric alcohols such as diethylene glycol, triethylene glycol, glycerol, 1,2,3-butanetriol, 1,2,4-butanetriol or 1,2,6-hexanetriol The main components of the ink of the present invention are described above. Other various kinds of dispersant, surface active agent, viscosity modifier, surface tension modifier, fluorescent brightening agent and so forth may optionally be added so long as they do not hinder the objects of the present invention from being achieved.

For example, they include viscosity modifiers such as polyvinyl alcohol, celluloses and water-soluble resins; all sorts of surface active agents of a cationic, anionic or nonionic type; surface tension modifiers such as diethanolamine and triethanolamine; pH adjusters comprising a buffer; and mildewproofing agents.

A specific-resistivity modifier comprising an inorganic salt such as lithium chloride, ammonium chloride and sodium chloride may also be added in order to prepare an ink used in ink-jet recording of the type the ink is electrically charged.

The ink of the present invention is particularly preferable in the case when applied in ink-jet recording of the type the ink is ejected utilizing a phenomenon of ink bubbling caused by heat energy, and has the features that the ink can be ejected very stably and no satellite dots are generated. In this case, however, the values of thermal properties, e.g., specific heat, coefficient of thermal expansion, and thermal conductivity must be controlled in some instances.

The ink of the present invention can settle the problems concerning the feathering, the drying performance of recorded characters or the like and the penetrability that arise when recording is carried out on plain paper or the like. At the same time, it can match the recording head in an improved state. From these viewpoints, the physical properties of the ink itself should be controlled to give a surface tension of 30 dyne/cm to 68 dyne/cm at 25° C. and a viscosity of not more than 20 cP, preferably not more than 15 cP, and more preferably not more than 10 cP.

Thus, in order to control the ink to have the above physical properties and more satisfactorily settle the problems involved in the printing on plain paper, the ink of the present invention should preferably be controlled to have a water content of not less than 10% by weight, preferably not less than 30% by weight, and more preferably not less than 50% by weight.

The ink-jet recording of the present invention is a recording process characterized in that the above ink is used and plain paper is used as a recording medium. This ink-jet recording may be carried out by any conventionally known methods without any particular limitations. In the present invention, for example, what can be effectively used is the method disclosed in Japanese Patent Application Laid-open No. 54-59936, which is a method in which an ink having received the action of heat energy causes an abrupt change in volume and the ink is ejected from nozzles by the force of action produced by this change in state.

The recording medium used in the present invention is non-coated paper such as paper for copying, paper for reporting, notepaper, letter paper, bond paper or continuous business form paper, i.e., what is called plain paper, commonly used in offices and homes. On these kinds of plain paper, recording can be performed in a feathering-free state, on a superior print quality level and with good fixing performance.

The ink of the present invention as described above is suited for use in the recording on the aforesaid plain paper. Besides, it can be also used of course for recording mediums specially prepared for ink-jet recording and other recording mediums.

The ink of the present invention can be particularly preferably used in the ink-jet recording in which recording is carried out by ejecting ink in the form of ink droplets by the action of heat energy.

The apparatus suited to carry out recording by the use of the ink of the present invention can be exemplified by an apparatus in which a heat energy corresponding with a recording signal is imparted to the ink held in the interior of a recording head so that ink droplets are generated by the action of the heat energy.

Figure 1B:
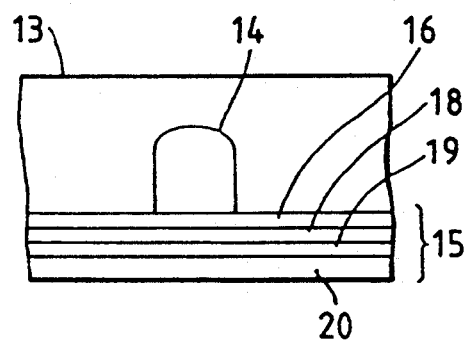

FIGS. 1A and 1B show an example of the construction of the head, which is a main component of the ink-jet recording apparatus.

In the drawings, a head 13 is formed by bonding a glass, ceramic or plastic plate or the like having a channel 14 through which ink is passed, to a heating head 15 used in thermal recording (the drawing shows a head, to which, however, is not limited). The heating head 15 is comprised of a protective film 16 formed of silicon oxide or the like, aluminum electrodes 17-1 and 17-2, a heating resistor layer 18 made of nichrome or the like, a heat accumulating layer 19, and a substrate 20 with good heat dissipation properties.

The ink 21 stands reached an ejection orifice (a minute opening) 22 and a meniscus 23 is formed there by a pressure P.

Figure 2:
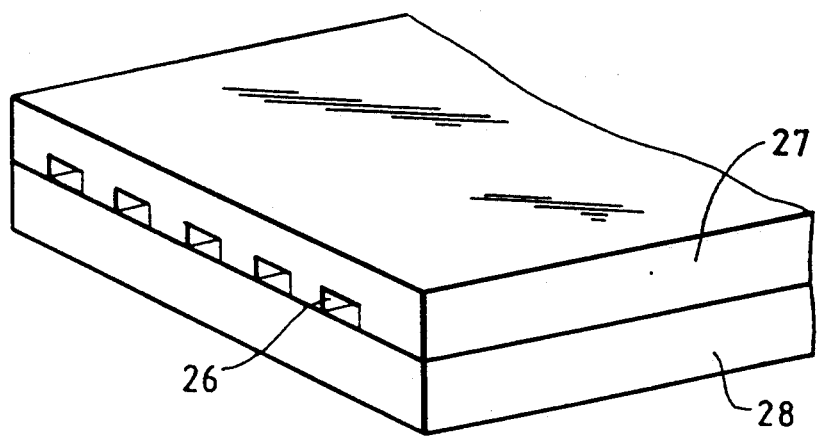
FIG. 2 is a perspective illustration of the appearance of a multiple head comprising the head as shown in FIGS. 1A and 1B.

Now, upon application of electric signals to the electrodes 17-1 and 17-2, heat is abruptly generated at the region denoted by n in the thermal head 15, so that bubbles are generated in the ink 21 coming into contact with this region. The pressure thus produced thrusts out the meniscus 23 and the ink 21 is ejected from the orifice 22 in the form of recording minute drops 24 to fly against a recording medium 25. FIG. 2 illustrates the appearance of a multi-head comprising the head as shown in FIG. 1A arranged in a large number. The multi-head is prepared by closely adhering a glass plate 27 having a multi-channel 26, to a heating head 28 similar to the head as illustrated in FIG. 1A.

FIG. 1A is a cross-sectional view of the head 13 along its ink flow path, and FIG. 1B is a cross-sectional view along the line 1B—1B.

Figure 3:
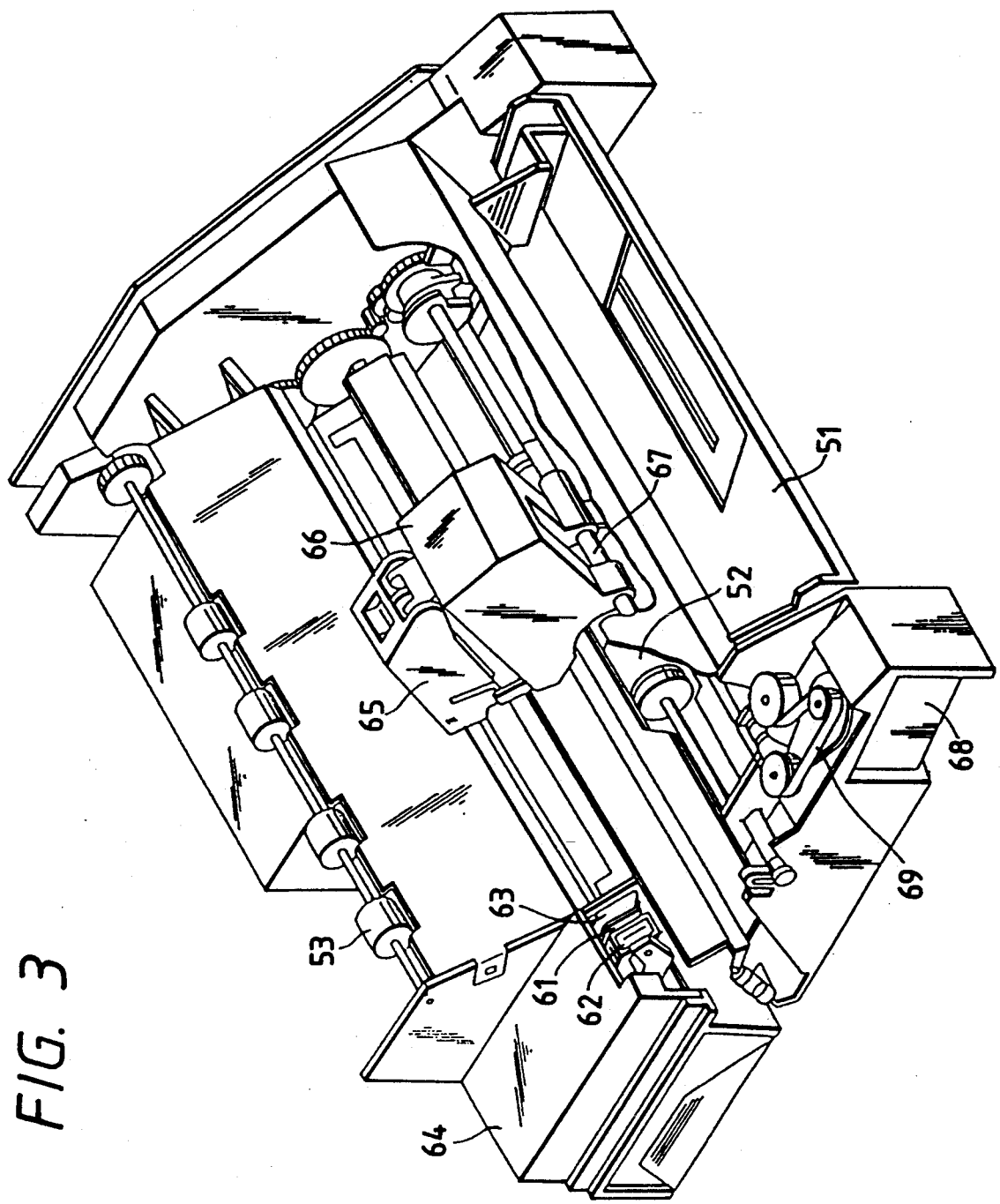
FIG. 3 is a perspective illustration of an example of ink-jet recording apparatus.

FIG. 3 shows an example of an ink-jet recording apparatus in which such a head has been incorporated.

In FIG. 3, reference numeral 61 denotes a blade serving as a wiping member in the form of a cantilever, one end of which is a stationary end retained by a blade-retaining member. The blade 61 is provided at the position adjacent to the region in which a recording head makes a record. In the present example, the blade is retained in such a form that it projects to the course through which the recording head is moved. Reference numeral 62 denotes a cap, which is provided at the home position adjacent to the blade 61, and is so constituted that it moves in the direction perpendicular to the direction in which the recording head is moved and comes into contact with the face of ejection openings to carry out capping. Reference numeral 63 denotes an ink absorber provided adjoiningly to the blade 61, and, similar to the blade 61, is retained in such a form that it projects to the course through which the recording head is moved. The above blade 61, cap 62 and absorber 63 constitute an ejection restoration assembly 64, where the blade 61 and the absorber 63 remove the water, dust or the like from the ink ejection opening face.

Reference numeral 65 denotes the recording head (the ink-jet device) having an ejection energy generating means and ejects ink to the recording medium set opposingly to the ejection opening face provided with ejection openings, to carry out recording. Reference numeral 66 denotes a carriage on which the recording head 65 is mounted so that the recording head 65 can be moved. The carriage 66 is slidably associated with a guide shaft 67. Part of the carriage 66 is connected (not shown) with a belt 69 driven by a motor 68. Thus, the carriage 66 can be moved along the guide 67 and hence the recording head 65 can be moved from a recording region to a region adjacent thereto.

Reference numeral 51 denotes a paper feeding part from which recording mediums are inserted, and 52, a paper feed roller driven by a motor (not shown). With such construction, the recording medium is fed to the position opposing to the ejection opening face of the recording head, and, with progress of recording, outputted from a paper output section provided with a paper output roller.

In the above constitution, the cap 62 of the head restoration assembly 64 is receded from the moving course of the recording head 65 when the recording head 65 is returned to its home position, e.g., after completion of recording, and the blade 61 stands projected to the moving course. As a result, the ejection opening face of the recording head 65 is wiped. When the cap 62 comes into contact with the ejection opening face of the recording head 65 to carry out capping, the cap 62 is moved in such a way that it projects to the moving course of the recording head.

When the recording head 65 is moved from its home position to the position at which recording is started, the cap 62 and the blade 61 are at the same position as the position where the ejection opening face is wiped. As a result, the ejection opening face of the recording head 65 is wiped also at the time of this movement.

The above movement of the recording head to its home position is made not only at the time of the completion of recording or restoration of ejection, but also when the recording head is moved between recording regions for the purpose of recording, during which it is moved to the home position adjacent to each recording region at given intervals, where the ejection opening face is wiped in accordance with this movement.

Figure 4:
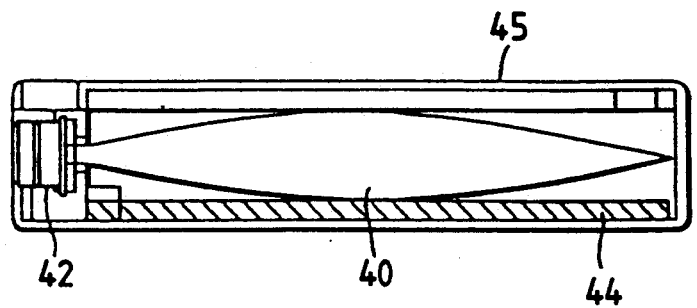
FIG. 4 is a longitudinal cross-sectional illustration of an ink cartridge.

FIG. 4 shows an example of an ink cartridge, denoted as 45, that has held the ink being fed to the head through an ink-feeding member as exemplified by a tube. Herein reference numeral 40 denotes an ink holder that has held the feeding ink, as exemplified by an ink bag. The top thereof is provided with a stopper 42 made of rubber. A needle (not shown) may be inserted to this stopper 42 so that the ink in the ink holder 40 can be fed to the head. The numeral 44 denotes an absorber that receives a waste ink.

It is preferred in the present invention that the ink holder is formed of a polyolefin, in particular, polyethylene, at its surface with which the ink comes into contact.

Figure 5:
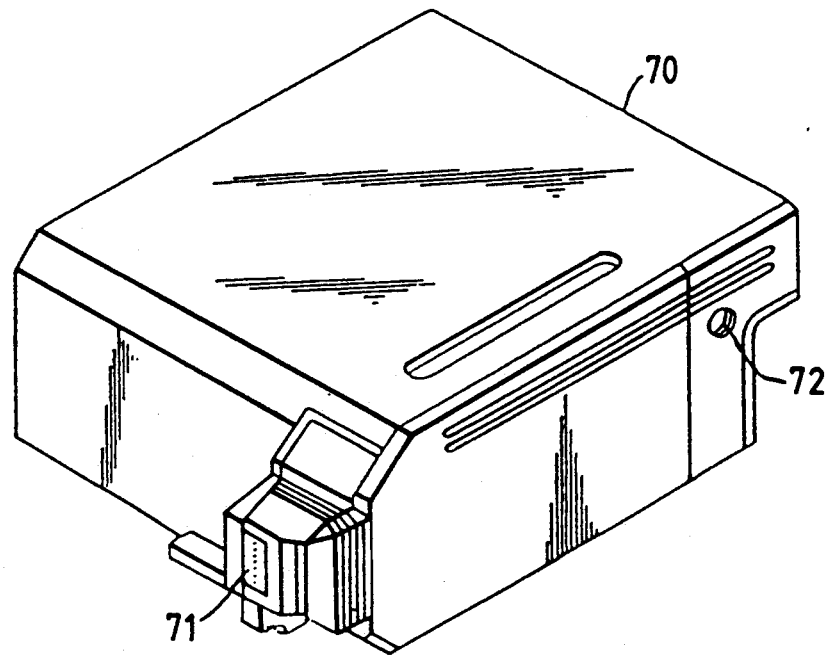
FIG. 5 is a perspective illustration of an ink-jet device.

The ink-jet recording apparatus used in the present invention may not be limited to the apparatus as described above in which the head and the ink cartridge are separately provided, and a device can also be preferably used in which these are integrally formed as shown in FIG. 5.

In FIG. 5, reference numeral 70 denotes an ink-jet device (a recording unit), in which an ink holding member impregnated with ink, as exemplified by an ink absorber, is contained. The ink-jet device is so constructed that the ink in the ink holding member is ejected in the form of ink droplets from a head 71 having a plurality of orifices. As a material for the ink holding member, it is preferred in the present invention to use polyurethane. The head has the same structure as those shown in FIGS. 1 and 2.

Reference numeral 72 denotes an air path opening through which the interior of the ink jet device communicates with the atmosphere.

This ink-jet device 70 can be used in place of the recording head 65 shown in FIG. 3, and is detachably mounted to the carriage 66.

As described above, according to the recording solution and recording process of the present invention, it becomes possible to make a record in a feathering-free state, on a superior print quality level and with good fixing performance, not only on coated paper specially prepared for ink-jet recording but also on non-coated paper such as paper for copying, paper for reporting, notepaper, letter paper, bond paper or continuous business form paper, i.e., what is called plain paper, commonly used in offices and homes.

According to the present invention, it is also possible to obtain an ink for ink-jet recording, having a high safety even when used in offices and homes.

According to the present invention, it is still also possible to carry out recording that does not cause clogging at the nozzles of a head for ink-jet recording, and also has a good reliability.

The ink cartridge, ink-jet device and ink-jet recording apparatus of the present invention can promise superior storage stability and ejection performance of the recording solution and also achieve a good frequency response.

EXAMPLES

The present invention will be described below by giving Examples and Comparative Examples. In the following, "part(s)" and "%" are by weight unless particularly noted.

Examples 1 to 9

The respective components as shown below were mixed and stirred for 5 hours. Thereafter, the resulting solution was adjusted to pH 7.5 with an aqueous 0.1% sodium hydroxide solution and then subjected to pressure filtration using a membrane filter (trade name: Fluoropore Filter; manufactured by Sumitomo Electric Industries, Ltd.) of 0.22 μm in pore size. Inks A to I of the present invention were thus obtained.

Next, recording was carried out using the resulting inks A to I and also using as an ink-jet recording apparatus an ink-jet printer BJ-130A (trade name; manufactured by Canon Inc.) of the type a heater element is used as an energy source for the ejection of ink. The recording was carried out on commercially available paper for copying and bond paper to evaluate the fixing performance of recorded characters or the like, the feathering occurrence, the anti-clogging when printing is again started after a pause of printing, the anti-clogging when printing is again started after a long-term stop of printing, and the frequency response. Results obtained are shown in Table 1. Tests for the evaluation were usually carried out under conditions of 25° C. and 60% RH.

| Ink A: | |
| --- | --- |
| C.I. Direct Yellow 86 | 2 parts |
| Compound 2 | 30 parts |
| Water | 68 parts |
| Ink B: | |
| C.I. Acid Red 35 | 2 parts |
| Compound 9 | 15 parts |
| 1,2,6-Hexanetriol | 5 parts |
| Water | 78 parts |
| Ink C: | |
| C.I. Food Black 2 | 3 parts |
| Compound 6 | 25 parts |
| Isopropyl alcohol | 2 parts |
| Water | 70 parts |
| Ink D: | |
| C.I. Direct Blue 199 | 2.5 parts |
| Glycerol | 7 parts |
| Compound 12 | 7 parts |
| Water | 83.5 parts |
| Ink E: | |
| C.I. Direct Black 154 | 2 parts |
| Compound B | 15 parts |
| Water | 83 parts |
| Ink F: | |
| C.I. Direct Black 51 | 3 parts |
| Compound 3 | 10 parts |
| Triethylene glycol | 7 parts |
| Triethanolamine | 5 parts |
| Water | 75 parts |
| Ink G: | |
| C.I. Direct Red 227 | 3.5 parts |
| Compound 5 | 7 parts |
| 1,2,4-Butanetriol | 7 parts |
| Ethanol | 2 parts |
| Water | 80.5 parts |
| Ink H: | |
| C.I. Reactive Blue 14 | 5.0 parts |
| Compound 11 | 5.0 parts |
| Diethylene glycol | 15.0 parts |
| 2-Butanol | 0.5 parts |
| Water | 74.5 parts |
| Ink I: | |
| C.I. Direct Black 168 | 4 parts |
| Compound 1 | 6 parts |
| Compound 9 | 14 parts |
| Trimethylolethane | 7 parts |
| Water | 69 parts |

Comparative Examples 1 to 5

Using the components as shown below, inks J to N of Comparative Examples 1 to 5 were obtained in the same manner as in Examples 1 to 9, and the evaluation on every item was made in the same manner as in Example 1. Results obtained are shown in Table 1.

| Ink J: | |
| --- | --- |
| C.I. Direct Yellow 86 | 2 parts |
| Glycerol | 15 parts |
| Water | 83 parts |
| Ink K: | |
| C.I. Food Black 2 | 3 parts |
| HO—CH$_2$—CH(OH)—CH$_2$—OCOCH$_3$ | 15 parts |
| Water | 82 parts |
| Ink L: | |
| C.I. Direct Blue 199 | 2.5 parts |
| Diethylene glycol | 15 parts |
| Ethylene glycol | 15 parts |
| Water | 67.5 parts |
| Ink M: | |
| C.I. Acid Red 35 | 2.5 parts |
| 1,2,4-Butanetriol | 15 parts |
| Isopropyl alcohol | 1 part |
| Water | 81.5 parts |
| Ink N: | |
| C.I. Direct Black 154 | 2.5 parts |

-continued $$CH_3COO-CH_2-\underset{\underset{OH}{|}}{CH}-CH_2-OCOCH_3 \quad 25 \text{ parts}$$

Water                                           72.5 parts

TABLE 1

| | Example | | | | |
|---|---|---|---|---|---|
| | 1 | 2 | 3 | 4 | 5 |
| Ink: | A | B | C | D | E |
| **Fixing performance:*1** | | | | | |
| Paper for copying | A | AA | A | A | A |
| Bond paper | AA | AA | AA | AA | AA |
| **Feathering Occurrence:*2** | | | | | |
| Paper for copying | A | A | A | B | A |
| Bond paper | A | A | A | A | A |
| Anti-clogging at the time of reprinting after pause:*3 | A | A | A | A | A |
| Anti-clogging at the time of reprinting after long term stop:*4 | A | A | A | A | B |
| Frequency response:*5 | A | AA | AA | AA | AA |

| | Example | | | |
|---|---|---|---|---|
| | 6 | 7 | 8 | 9 |
| Ink: | F | G | H | I |
| **Fixing performance:*1** | A | A | A | AA |
| Paper for copying | AA | AA | AA | AA |
| Bond paper | AA | AA | AA | AA |
| **Feathering Occurrence:*2** | | | | |
| Paper for copying | A | A | B | A |
| Bond paper | A | A | A | A |
| Anti-clogging at the time of reprinting after pause:*3 | B | A | A | A |
| Anti-clogging at the time of reprinting after long term stop:*4 | A | A | A | A |
| Frequency response:*5 | AA | AA | AA | A |

| | Comparative Example: | | | | |
|---|---|---|---|---|---|
| | 1 | 2 | 3 | 4 | 5 |
| Ink: | J | K | L | M | N |
| **Fixing performance:*1** | | | | | |
| Copy Paper for copying | C | B | C | B | A |
| Bond paper | C | B | C | B | A |
| **Feathering occurrence:*2** | | | | | |
| Copy Paper for copying | A | C | C | A | C |
| Bond paper | A | C | C | A | C |
| Anti-clogging at the time of reprinting after pause:*3 | B | B | A | B | A |
| Anti-clogging at the time of reprinting after long-term stop:*4 | A | B | C | A | C |
| Frequency response:*5 | A | A | A | A | A |

*1 Evaluation on fixing performance:

Characters were printed on commercially available paper for copying and bond paper, and then the printed characters were rubbed with a filter paper (trade name: No. 5C; available from Toyo Roshi K. K.) on lapse of 5 seconds and 15 seconds to make evaluation according to the following:

AA: Not blurred when rubbed on lapse of 5 seconds.
A: Slightly blurred when rubbed on lapse of 5 seconds.
B: Slightly blurred when rubbed on lapse of 15 seconds.
C: Greatly blurred when rubbed on lapse of 15 seconds.

*2 Feathering occurrence:

To examine the occurrence of feathering, 300 dots were printed with a printer on commercially available paper for copying and bond paper, in a discontinuous fashion. Thereafter, the printed dots were left to stand for 1 hour or more and then the number of dots on which the feathering occurred was counted through observation with a microscope. The proportion of the count to the total number of the dots was indicated by % to make evaluation according to the following:

A: 10% or less
B: 11% to 30%
C: 31% or more

*3 Anti-clogging at the time of re-printing after pause:

"Anti-clogging at the time of re-printing after pause" is meant to be the anti-clogging observed when printing is again started after a temporary stop of printing. A given ink was charged in the printer. English characters were continuously printed for 1 minute and then the printing was stopped. After the printer was left to stand for 1 minute in an uncapped state, English characters were again printed. The evaluation was made on whether or not there was defective print such as blurred characters or characters with unsharp edges.

A: No defective print is seen on the first and subsequent characters.
B: Satellite dots or twists are seen on the first and subsequent characters.
C: Part of the first character is blurred or has unsharp edges.

*4 Anti-clogging at the time of re-printing after long-term stop:

"Anti-clogging at the time of re-printing after long-term stop" is meant to be the anti-clogging observed when printing is again started after the printing has been stopped for a long period of time. A given ink was charged in the printer, and English characters were continuously printed for 10 minutes and thereafter the printing was stopped. After the printer was left to stand for 7 days in an uncapped state (left at 60° C., 10±5% RH), restoration of nozzles having clogged was operated. The evaluation was made on the basis of the times of the operation for restoration carried out until normal printing becomes possible without defective print such as blurred characters or characters with unsharp edges.

A: Normal printing is possible after restoration is operated once to 5 times.
B: Normal printing is possible after restoration is operated 6 to 10 times.
C: Normal printing is possible after restoration is operated 11 times or more.

*5 Frequency response:

The state of print obtained by the printing, i.e., defectiveness such as blurred characters or blank areas and defective ink-droplet impact such as splash or twists was observed with the naked eye to make evaluation.

AA: The ink can be shot under good follow-up to the frequency, so that none of blurred characters, blank areas and defective ink-droplet impact are seen in both solid print and character print.
A: The ink can be shot under substantially good follow-up to the frequency, so that none of blurred characters, blank areas and defective ink-droplet impact are seen in character print, but with slightly blurred characters in solid print.
B: None of blurred characters and blank areas are seen in solid print, but defective ink-droplet impact is partly seen. In solid print, blurred characters and blank areas are seen in about one-third of the whole of the solid print.
C: A large number of blurred characters and blank areas are seen in solid print, and a large number of blurred characters and defective ink-droplet impact are also seen in character print.

With regard to each ink in Examples 1 to 9, the ink absorber of the ink-jet device as shown in FIG. 5 was impregnated with the ink. Then the ink-jet recording apparatus as shown in FIG. 3 was loaded with the ink-jet device. Recording was carried out using this ink-jet recording apparatus. As a result, it was possible to carry out good recording with an excellent ejection performance.

What is claimed is:

1. A recording solution comprising a coloring matter and a liquid medium, wherein said recording solution contains a compound obtained by alkylation of one or two hydroxyl group(s) of a triol having 4 or more carbon atoms.

2. The recording solution according to claim 1, wherein said compound has 4 to 10 carbon atoms.

3. The recording solution according to claim 1, wherein said compound has 4 to 7 carbon atoms.

4. The recording solution according to claim 1, wherein said compound is contained in an amount of from 0.01% by weight to 80% by weight based on the total weight of the recording solution.

5. The recording solution according to claim 1, wherein said coloring matter is contained in an amount of from 0.2% by weight to 20% by weight based on the total weight of the recording solution.

6. The recording solution according to claim 1, further comprising water.

7. The recording solution according to claim 1, further comprising water and a water-soluble organic solvent.

8. A recording solution comprising a coloring matter and a liquid medium, wherein said recording solution contains a compound obtained by acetylation of one or two hydroxyl group(s) of a triol having 4 or more carbon atoms.

9. The recording solution according to claim 8, wherein said compound has 4 to 10 carbon atoms.

10. The recording solution according to claim 8, wherein said compound has 4 to 7 carbon atoms.

11. The recording solution according to claim 8, wherein said compound is contained in an amount of from 0.01% by weight to 80% by weight based on the total weight of the recording solution.

12. The recording solution according to claim 8, wherein said coloring matter is contained in an amonnt of from 0.2% by weight to 20% by weight based on the total weight of the recording solution.

13. The recording solution according to claim 8, further comprising water.

14. The recording solution according to claim 8, further comprising water and a water-soluble organic solvent.

* * * * *

UNITED STATES PATENT AND TRADEMARK OFFICE
CERTIFICATE OF CORRECTION

PATENT NO. : 5,254,157

DATED : October 19, 1993

INVENTOR(S) : Koike et al.

It is certified that error appears in the above-identified patent and that said Letters Patent is hereby corrected as shown below:

COLUMN 1:

Line 51, "kind" should read --kinds--.

COLUMN 2:

Line 2, "kind" should read --kinds--.

COLUMN 4:

Line 10, "compound" should read --compounds--.

COLUMN 5:

Line 63, "1,2,6-hexanetriol" should read
     --1,2,6-hexanetriol.--.

COLUMN 7:

Line 49, "in" should read --into--; and
   Line 59, "in" should read --into--.

UNITED STATES PATENT AND TRADEMARK OFFICE
CERTIFICATE OF CORRECTION

PATENT NO.   : 5,254,157
DATED        : October 19, 1993
INVENTOR(S)  : Koike et al.

It is certified that error appears in the above-identified patent and that said Letters Patent is hereby corrected as shown below:

COLUMN 11:

Line 26, "A A A AA" should be deleted; and
   Line 27, "AA AA AA AA" should read --A A A AA--.

COLUMN 14:

Line 20, "amonnt" should read --amount--.

Signed and Sealed this

Fourteenth Day of June, 1994

Attest:

BRUCE LEHMAN

Attesting Officer     Commissioner of Patents and Trademarks